US006177743B1

(12) United States Patent
Hartramph et al.

(10) Patent No.: US 6,177,743 B1
(45) Date of Patent: Jan. 23, 2001

(54) LINEAR DRIVE

(75) Inventors: Ralf Hartramph, Waiblingen; Eberhard Veit, Göppingen; Hans Scheurenbrand, Kernen, all of (DE)

(73) Assignee: Festo AG & Co., Esslingen (DE)

( * ) Notice: Under 35 U.S.C. 154(b), the term of this patent shall be extended for 0 days.

(21) Appl. No.: 09/439,470

(22) Filed: Nov. 15, 1999

(30) Foreign Application Priority Data

Nov. 24, 1998 (DE) .............................................. 198 54 142

(51) Int. Cl.$^7$ ...................................................... H02K 5/00
(52) U.S. Cl. ............................ 310/89; 310/12; 310/112; 60/698; 60/720
(58) Field of Search .......................... 60/720, 698; 91/55; 92/13.1, 145; 310/12, 29, 14, 15, 17, 112

(56) References Cited

U.S. PATENT DOCUMENTS

| 2,660,028 | * | 11/1953 | Geyer ..................................... 60/698 |
| 3,050,943 | * | 8/1962 | Thorel et al. ........................... 310/12 |
| 5,469,775 | | 11/1995 | Stoll et al. .............................. 92/88 |
| 5,568,982 | | 10/1996 | Stoll et al. .............................. 384/55 |
| 5,609,091 | | 3/1997 | Stoll ...................................... 92/110 |
| 5,637,940 | | 6/1997 | Nagai et al. ............................ 310/80 |
| 5,638,676 | | 6/1997 | Muller .................................... 60/407 |
| 5,685,214 | * | 11/1997 | Neff et al. .............................. 310/12 |
| 5,746,110 | | 5/1998 | Stoll ...................................... 92/13.6 |
| 5,844,340 | * | 12/1998 | Noda et al. ............................ 310/103 |
| 6,014,924 | | 1/2000 | Stoll et al. .............................. 92/13.5 |

FOREIGN PATENT DOCUMENTS

| 195 12 080 A1 | 10/1995 | (DE) ................................ H02K/7/06 |
| 297 06 098 U | 5/1997 | (DE) ................................ F16C/29/04 |

* cited by examiner

*Primary Examiner*—Burton Mullins
(74) *Attorney, Agent, or Firm*—Hoffmann & Baron, LLP

(57) ABSTRACT

A set of independently usable linear drive, which include at least one fluid power and at least one electrical linear drive. The principal housing bodies of the linear drive are respectively provided with an elongated receiving space, in which fluid power drive means or electrical drive means are located dependent of the type of drive. As regards their outer shape the principal housing bodies at least essentially the same and their receiving spaces possesses the same cross sectional form. Accordingly on the basis of a large number of the identical component different types of linear drive may be produced.

20 Claims, 3 Drawing Sheets

LINEAR DRIVE

BACKGROUND OF THE INVENTION

The invention relates to a set of linear drives, able to be employed independently of each other, including at least one fluid power linear drive and at least one electrical linear drive, whose principal housing body is in each case provided with an elongated receiving space, the receiving space of the fluid power linear drive containing fluid power drive means and the receiving space of the electrical linear drive comprising electrically operatable drive means therein.

THE PRIOR ART

Fluid power linear drives have been disclosed, see for example the German patent publication (utility model) 29,706,098.8, whose drive means are operated by fluid power, since they are subjected to the action of fluid and more particularly pneumatic pressure medium.

Furthermore there are electric linear drives, as disclosed for instance in the German patent publication 19,512,080 A1, which possess electrically operated drive means, which may be put into operation by the application of electrical power.

The selection of the type of linear drive suitable for a given purpose is as a rule set by circumstances which can not be changed. If extremely rapid movement are required or if operation in damp surroundings is necessary, recourse is generally had to fluid power linear drives. If no sufficient the supply of fluid is available or if slow, jerk-free motion is required, use is commonly made of an electrical linear drive. In this connection there has so far been a difficulty to the extent that in the case of all different possible designs of linear drive it is a question of completely separate series of models, which are manufactured independently of each other, the measures to be taken at the site of application being taken to suit the particular design.

SHORT SUMMARY OF THE INVENTION

One object of the invention is to create electrical and fluid power linear drives, which in use are at least substantially compatible and in whose production largely identical method steps are required.

In order to achieve these and/or other objects appearing from the present specification, claims and drawings, in the present invention in the context of the features recited in the preamble of claim 1 the principal housing body of the at least one fluid power linear drive and of the at least one electrical linear drive are at least substantially the same in their outer shape and the receiving spaces formed in the principal housing bodies of the two drives possess the same cross sectional configuration.

It is in this manner that in the production of fluid power linear drive and of an electrical linear drive it becomes passible to make use of principal housing bodies which are to a large extent the same in their dimensions, the outer form, which is identical ensuring compatibility in a particular case of application and rendering possible recourse to identical production tooling. Since the receiving spaces of the principal housing bodies on each side possess the same cross sectional configuration, for manufacturing operations fluid power drive means or electrically operated drive means may be installed dependent on the desired structure without complex changes in the design of the principle housing body. The manufacturer of linear drives is accordingly extremely adaptable as regards changing his palette of products, it being possible for him to employ substantially identical method steps and tools regardless of the type of linear drive and by the selective use of electrical or fluid power drive means to define the desired type.

Further advantageous developments of the invention are defined in the claims.

The drive means of the two types of linear drive are preferably connected with a force transmission part extending from the principal housing body and preferably in the form of a rod, such transmission part for its part being able to be connected directly or indirectly with an object to be moved. In order to ensure high precision it is possible for the force transmission part to engage a guide carriage, which runs in a linear sliding manner externally on the principal housing body and is able to deal with acting transverse forces with the result that the drive means accommodated in the receiving space are substantially free of loads prone to cause wear. In this connection there may be an identical design of the combination of the guide carriage and of the principal housing body, something which renders possible the use of the maximum number of identical parts with a concomitant reduction substantial reduction in production and stockholding costs.

The drive means utilized in the electrical linear drive preferably belong to an electrical linear motor which is a special design of an electric motor and in the case of which the moving part of the motor is not caused to perform a rotary but a linear motion, since the drive is preferably in the form of a moving magnetic field. Linear drives of this type are for example described in the brochure."Linearantriebe LinMot-P" of the Sulzer Electronics Company AG, in which however there is no mention of the advantageous application as a substitute for fluid power drive means in an identically designed principal housing body.

It is particularly advantageous to utilize an electric linear motor, if it is plugged coaxially as a cartridge-like unit into the receiving space of the principal housing body so that extremely simple assembly and, if required, quick replacement is possible.

The linear motor of the electrical linear drive may contain a motor housing arranged along at least a major part of its length in the interior of the associated receiving space, from which housing at one end a power transmission member (which cooperates with the drive means and is preferably rod-like) extends and which at the opposite axial end has electrical connection means for the input and/or output of electrical signals, which are relevant for the operation of the linear motor.

The motor housing of the electrical linear drive is best of tubular form along at least part of its length and extends axially into the receiving space, its outline being complementary to the inner shape of the receiving space with the result that the parts are securely located and held in position. In this connection it is for example to have a provision such that the cross section of the motor housing and of the receiving space are circular or non-circular, the non-circular design being more especially preferred, when an arrangement of the linear drive unit locked against rotation in relation to the principal housing body is desired.

The principal housing body of the linear drives preferably comprise extruded sections, which may be manufactured cheaply.

Further advantageous developments and convenient forms of the invention will be understood from the following detailed descriptive disclosure of embodiments thereof in conjunction with the accompanying drawings.

LIST OF THE SEVERAL VIEWS OF THE FIGURES

DETAILED ACCOUNT OF WORKING EMBODIMENTS OF THE INVENTION

Figure 1:
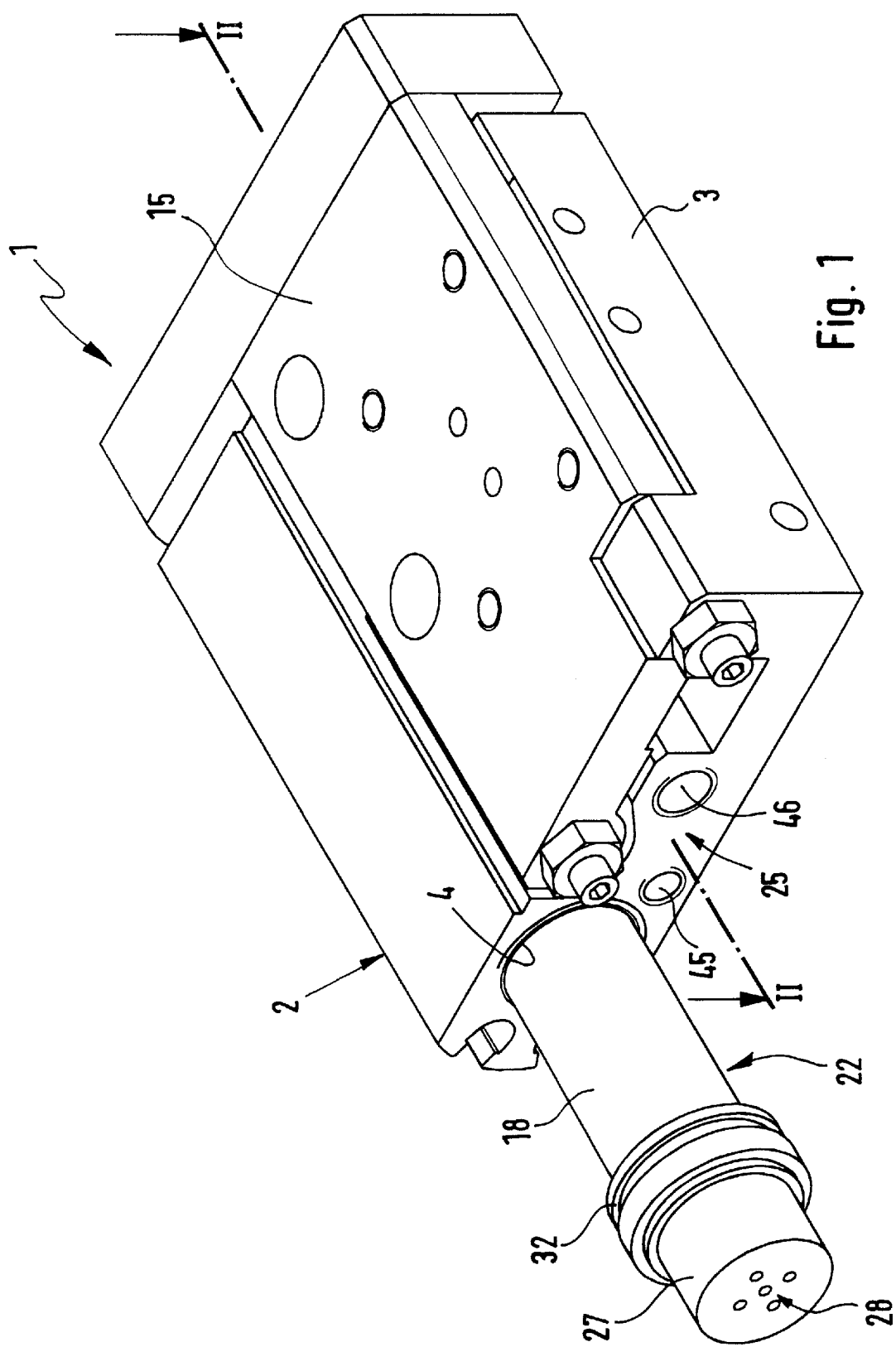
FIG. 1 shows a preferred design of an electrical linear drive in an oblique perspective view looking toward the rear side, the electric linear motor employed for the drive being illustrated in an intermediate position as assumed during assembly.
Figure 2:
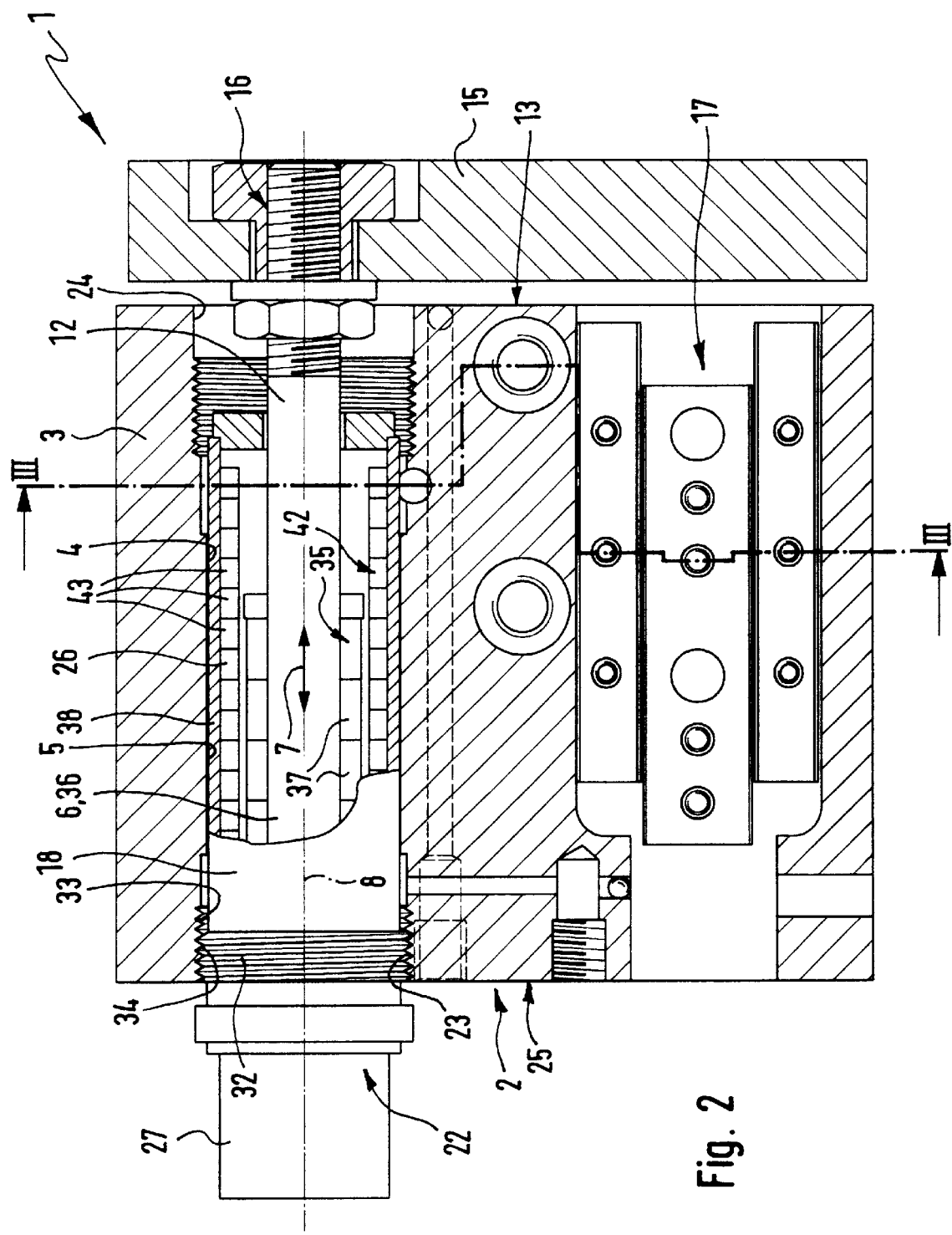
FIG. 2 shows the linear drive of FIG. 1 in a horizontal longitudinal section on the section line II—II.
Figure 3:
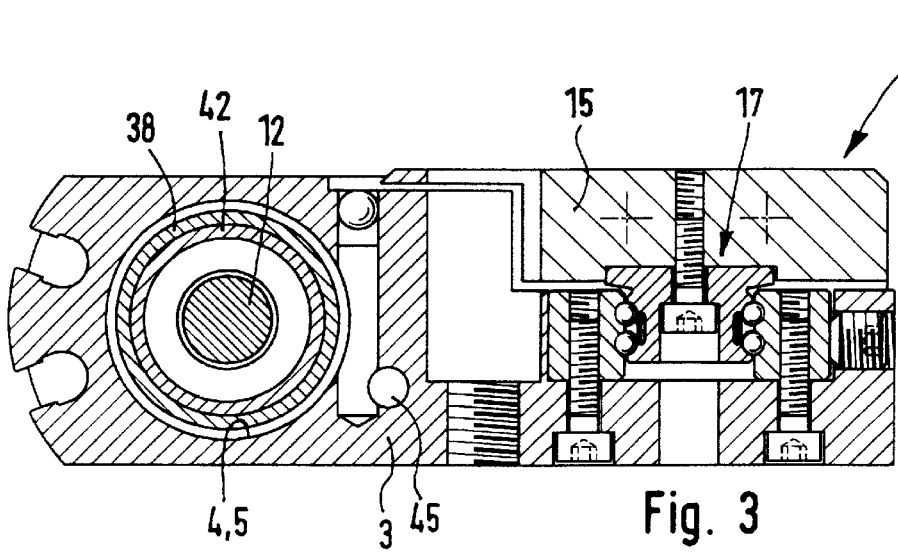
FIG. 3 shows the linear drive of FIGS. 1 and 2 in a cross section taken on the line III—III of FIG. 2.
Figure 4:
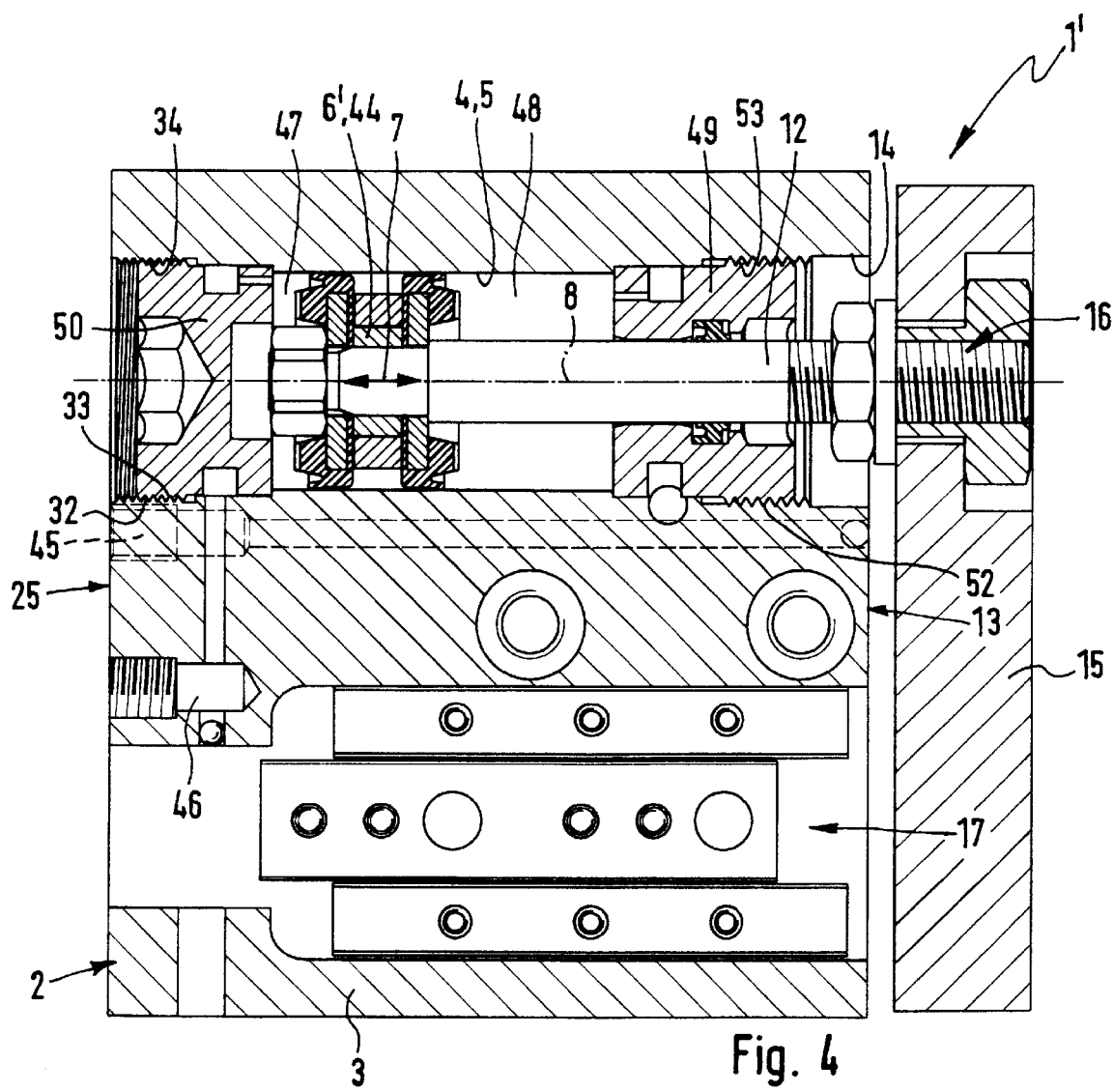
FIG. 4 shows a fluid power linear drive in a longitudinal section similar to that of FIG. 2, which differs from the electrical linear drive of FIGS. 1 through 3 merely as regards the drive means while in other respects it has an identical structure.

The electrical linear drive 1 depicted in FIGS. 1 through 3 and the fluid power linear drive 1' illustrated in FIG. 4 each have a housing 2 generally referenced 2 possessing a principal housing body 3 preferably produced by extrusion. The housing is preferably manufactured of an aluminum alloy. housing 2 delimits an elongated cavity 4, which preferably is constituted by an elongated receiving space 5 extending axially through the principal housing body 5, which may be formed in the course of manufacture as a result of extrusion of the principal housing body 3. The receiving space 5 is preferably peripherally complete, i.e. without interruption, along its full length.

In the interior of the receiving space 4 drive means 6 and 6' are accommodated, which may be operated by the supply of external power or energy to perform a reciprocating linear movement 7 as indicated by the double arrow along the longitudinal axis 8 of the cavity 4 or, respectively, of the receiving space 5. The linear motion 7 may be transmitted to a preferably rod-like force transmission member 12 outside the housing 2 and permanently axially connected with the drive means 6 and 6', said member 12 projecting clear from that axial end region 14 of the cavity 4, which is adjacent to the end side of the principal housing body 3, which in the following will be termed the front side 13.

At the outer end of the force transmission member 12 apart to be moved could be directly attached. However in order to increase precision of motion and to reduce wear of the drive means 6 and 6' and of the force transmission member 12 it is however an advantage if the section, which is outside the cavity 4, of the force transmission member 12 is, as generally illustrated in working examples, secured to a guide carriage 15 (at a point 16), which for its part guided by a suitable linear guide means 17 slides along the principal housing body 3 in parallelism to the longitudinal axis 8.

It is convenient for the guide carriage 15 to overlap the principal housing body 3 in the axial direction, the degree of overlap being dependent on the actual size of the stroke of the associated drive means 6 and 6'. The guide carriage 15 is suitable for attachment of any desired components to be shifted, the linear guide means 17 resisting the transverse force occurring so that the drive side is freed of loads with respect to this.

In the case of the embodiments the arrangement is such that the drive part having the drive means 6 and 6' and the guide part having the longitudinal guide means 17, of the respective linear drive 1 and 1' are arranged alongside one another so that the design is particularly low in height. Other arrangements would however be possible, as for example a guide carriage running and arranged above the drive part.

The electrical linear drive 1 of FIGS. 1 through 3 is characterized more especially by having its drive means 6 as a component of a electrical linear motor 18, which is inserted as a cartridge-like unit (referred to in the following as a linear motor unit 22) in the cavity 4 and secured in relation to the housing. All drive parts are hence collected together compactly and in the illustrated working example are inserted through one of the end openings 23 and 24 coaxially into the receiving space 5.

This means that the assembly of the electrical linear drive 1 is extremely simple and time lost through servicing is considerably reduced, because when there is a defect rapid replacement of the linear motor unit 22 may take place.

In the case of the illustrated working example the linear motor unit 22 is inserted through the opening 23, placed at the rear side of the principal housing body 3, into the receiving space 5. The overall length of the linear motor 18 is so adapted to the overall length of the linear motor 18 that it is to a large extent completely received in the interior of the receiving space 5.

In the illustrated working embodiment the arrangement is such that the housing 26 of the linear motor is practically completely inserted into receiving space 5 and it is merely an interface member 27, adjoining the motor housing at the rear, which projects past the principal housing body 3. The interface member 27 has an only diagrammatically indicated electrical connection means 28, which serve for the input and/or output of signals needed for the operation of the linear motor 18. Via the electrical connection means electrical actuating signals are regularly supplied, which cause the linear stroke movement of the drive means 6. Furthermore it is possible for the output of detection signals to take place, which come from a position detecting means integrated in the linear motor 18 and with the aid of such signals the axial position of the drive means 6 and of the force transmission member 12 connected to it may be exactly found.

The electrical connection means 28 may, as illustrated, be a component of a multiple pole coupling means, which is more particularly designed in the form of a plug-in means.

The mounting of the linear motor 18 fixed to the housing can make use of any suitable attachment means. In the illustrated working embodiment this aim is for example achieved since the linear motor 18 has its housing 26 screwed in the receiving space 5. For this purpose the motor housing 26 has an external screw thread 32 which is preferably limited to the rear end region of the motor housing 26 and which fits into a complementary female thread 33, which is provided in the rear axial end region 34 of the receiving space 5. Thus assembly takes place using a combined plugging in and screwing operation, the linear motor 18 being moved with its unthreaded front region foremost into the rear opening 23 and into the receiving space 4 until the male screw thread 32 comes into contact with the female screw thread 33, whereafter the motor housing 26 is still turned about the longitudinal axis 8 until the two screw threads are screwed together and both the axial and also the angular position of the motor housing 26 is set in relation to the principal housing body 3. The axial position of the may be preset in this case by the predetermined thread length or by separate abutment means not illustrated in detail.

More particularly in the case of an embodiment wherein the linear motor 18 at least is put in place with a rotary movement in the receiving space 4, it is an advantage for at least the length section of the motor housing 26 within the receiving space 4 to have a circular outline. This circularly cylindrical section of the length then means that the motor housing makes good mechanical engagement with the internal face of the receiving space 5, when the latter is, as in the present case, complementary to the outline of the respective length section of the motor housing 26.

However configurations are possible, in the case of which the inner cross section outline of the receiving space 5 and the outer outline of the length section, arranged in same, of the motor housing 26 are non-circular in design, for example oval or polygonal and more particularly rectangular or square cross sections being possible. Such designs offer the advantage that the angular position of the motor housing is automatically predetermined and simultaneously there is a locking action to prevent undesired rotation.

Owing to the exact adaptation of the cross sectional forms or outlines it is possible to ensure that the linear motor 18 is well supported and held even if the attachment means (screw threads 32 and 33) serving for axial locking are limited to the rear end region of the motor housing 26.

The linear motor 18 itself can be of known design as for example described in the general review in the said brochure "Linearantriebe LinMot-P" of the Sulzer Electronics Company AG. It is preferred for the linear motor to operate in accordance with the electrodynamic principle, the retroactive forces being developed in connection with a permanent magnet arrangement 35. The drive means 6 are constituted by an armature 36, which is for example piston-like and carries the said permanent magnet arrangement 35, which for its part consist of a plurality of coaxially following and preferably segmented annular permanent magnets 37, which are radially magnetized, the magnetization of sequentially following permanent magnets 37 being opposite. The permanent magnet arrangement 35 is mounted on a carrier, which in the working embodiment of the invention is constituted by a longitudinal section of the force transmission member 12.

The armature 36 is located in the interior of a tubular longitudinal section 38 of the motor housing 26, which is preferably manufactured of steel material and constitutes a magnetic return path. On the inner face of the tubular length section 38 a tubular coil arrangement 42 is located which surrounds the armature 36 coaxially with radial play and comprises a plurality of axially sequentially placed coil parts 43, whose axial width is preferably in each case equal to half the width of the permanent magnets 37. The coil parts are in the working example connected so that one half is placed in series with each other, one half of the coils being opposite in its direction of magnetization in order to achieve a uniform development of force. Drive is by electrical voltage signals via electrical terminal means 28 in such a manner that a traveling field is generated, which causes linear drive of the armature 36 in the one or the other axial direction in relation to the coil arrangement 42 and to the motor housing 26.

The coil arrangement 42 can be so designed that it may be employed for detecting the position of the armature 36 so that it is possible to speak of a position detection system integrated in the drive motor.

It will be clear that the electrical linear drive renders possible a design, which is practically identical to that of fluid power and for example pneumatic linear drive so that on starting the basis of like components it is possible to produce linear drives for selectively electrical and fluid power operation as desired in a rational and adaptable manner. FIG. 4 makes this more particularly clear, which shows a fluid power linear drive 1', whose structure is the same as that of the electrical linear drive of FIGS. 1 through 3 apart from the different drive means itself.

In the case of the fluid power linear drive 1' of FIG. 4 these components which are the same as regards the electrical linear drive are given identical reference numerals. As will be readily apparent, the combination composed of the guide carriage 15 and the principal housing body 3 is the same in both types of linear drive 1 and 1'. Instead of electrically driven drive means 6 fluid power drive means 6' are however now utilized, which in the working example are constituted by a piston 44, which is located in the cavity 4 to permit axial sliding motion, it running on the inner peripheral face of the receiving space 5. The linear motor into the 22 is in this case removed in a complete form and the force transmission member 12 comprises a piston rod, which at one end is attached to the piston and at the other end engages the guide carriage 15.

As compared with the electrical linear drive 1 the outer form of the fluid power linear drive 1' is at least substantially and preferably completely identical, there being the further similarity that the receiving spaces 5 in both cases have the same cross sectional form. There is thus the possibility of having selectively an electrical linear motor 18 or a piston 44 in the receiving space 5 on the basis of the same size of the housing 2 so that there is the possibility of selecting the type of operation of the linear drive in accordance with requirements.

In the interior of the principal housing body 3 fluid ducts 45 and 46 are formed, which are only employed in the case of a fluid power application of the linear drive 1' and in the case of use as an electrical linear drive 1 are left unused. They serve in the case of use as a fluid power linear drive 1' as in FIG. 4 for the supply and/or removal of the fluid and preferably pneumatic pressure medium for the piston 44.

Each of the two fluid ducts 45 and 46 extends in the interior of the principal housing body 3 between an outer face of the housing—in the present case the rear side 25—and one of two working spaces 47 and 48, which are divided off from each by the piston 44 in the receiving space 5. At its two axial end regions 14 and 34 the receiving space 5 is sealed off by a respective terminating wall 49 and 50 fixed to the housing, each of such terminating walls 49 and 50 constituting a limiting wall, opposite to the piston 44, for one of the working spaces 47 and 48. Thus via external duct openings, with which fluid ducts may be connected, the fluid actuation in the working spaces 47 and 48 and therefore the axial stroke of the piston 44 and of the force transmission member 12 may be produced as required.

The rear terminating wall 50 is like a lid and is more especially axially inserted into the receiving space 5 so that it preferably does not project past the rear side 25. Attachment is by screw means, the above mentioned female screw thread 33 being employed, into which the rear terminating wall 50 is screwed, which has a complementary external screw thread 54.

Using a similar screw attachment means the front terminating wall 49 is attached to the principal housing body 3, since its external screw thread 52 is screwed into a rear end section 14 of the receiving space 5 having an internal screw thread 53. This internal screw thread 53 may be without any function in the case of a linear drive of the electrical type in accordance with FIGS. 1 through 3.

The front terminating wall 49 of the housing 2 designed in the form of a ring or sleeve, it surrounding the rod-like force transmission member 12 with a sealing effect. The front terminating wall 49 as well preferably assumes a position in which its entire length is axially within the receiving space 5.

It will be apparent that there is the possibility of providing a plurality of independently employed linear drives, including at least one electrical linear drive 1 and at least one fluid power linear drive 1', these two linear drives being essentially the same as regards their external shape so that during manufacture at least to a major extent recourse may be had identical part and consequently to identical tools there is also compatibility at the site of application as regards installation. The identical, shared cross section here offers the possibility of incorporating electrical drive means 6 or fluid power drive means 6', something which leads to great flexibility in the manufacture of the linear drive. If furthermore the electrical drive means belong to a compactly designed cartridge, assembly is particularly simplified, because assembly simply by insertion is possible, which saves time.

What is claimed is:

1. A linear drive comprising:

a housing body; and a receiving space provided in said housing dimensioned for receiving a drive means, the drive means comprising one of a fluid power drive and an electrical linear drive such that the drive means has substantially the same size and cross-section to permit either drive means to be inserted into the receiving space.

2. A linear drive as set forth in claim 1, wherein a force transmission member is attached to said drive means and engages a guide carriage, said carriage being positioned on an exterior surface of the housing body.

3. A linear drive as set forth in claim 2, wherein the combination comprising the guide carriage and the housing body is substantially the same regardless of the drive means.

4. A linear drive as set forth in claim 1, wherein the drive means of the fluid power linear drive comprises a piston adapted to slide axially on an inner periphery surface of the receiving space.

5. A linear drive as set forth in claim 4, wherein the electrical linear drive is in the form a cartridge linear motor and inserted coaxially into the receiving space and is secured in the housing body.

6. A linear drive as set forth in claim 1, wherein the receiving space extends completely through the housing body in a longitudinal direction.

7. A linear drive comprising a principal housing body having a receiving space dimensioned to receive one of a fluid power linear drive having fluid power drive means and an electrical linear drive comprising electrically operatable drive means, wherein the fluid power linear drive and electrical linear drive have substantially the same outer configuration to be fitted into the receiving space.

8. A linear drive as set forth in claim 7, wherein the drive means of the linear drive is connected with at least one force transmission member, projecting out from the principal housing body, said transmission member having a rod shape.

9. A linear drive as set forth in claim 8, wherein the force transmission member engages a guide carriage, said carriage being positioned on an exterior surface of the principal housing body.

10. A linear drive as set forth in claim 9, wherein the combination comprising the guide carriage and the principal housing body is substantially the same regardless of the drive means for the fluid power drive or the electrical linear drive.

11. A linear drive as set forth in claim 7, wherein the drive means of the fluid power linear drive comprises a piston adapted to slide axially on the inner periphery surface of the receiving space.

12. A linear drive as set forth in claim 7, wherein the receiving space of the fluid power linear drive is closed off at both axial end regions by at least one terminating walls secured to the principal housing body, said walls being preferably inserted into the receiving space.

13. A linear drive as set forth in claim 7, wherein the electrically operated drive is a component of an electrical linear motor.

14. A linear drive as set forth in claim 13, wherein the electrically operated motor is in the form of a cartridge shaped linear motor unit inserted coaxially into the receiving space and is secured in the principal housing body.

15. A linear drive as set forth in claim 13, wherein the linear motor of the electrical linear drive possesses a motor housing which is tubular in design for at least part of its length and extends into the receiving space, the outer shape of the length part extending into the receiving space, of the motor housing being designed to be complementary to the inner periphery of the receiving space.

16. A linear drive as set forth in claim 13, wherein the drive means of the electrical linear motor comprise a stationarily arranged coil arrangement and an armature adapted to move linearly and having a permanent magnet arrangement.

17. A linear drive as set forth in claim 13, wherein the linear motor of the electrical linear drive possesses a motor housing arranged for at least a major part of its length in the interior of the associated receiving space, the motor housing at one end including a force transmission member which cooperates with the drive means and projects therefrom and, at the other end, the motor housing possesses electrical connection means for the input and/or output of electrical signals.

18. A linear drive as set forth in claim 17, wherein the electrical connection means further comprises a plug.

19. A linear drive as set forth in claim 7, wherein the receiving space extends through the associated principal housing body in the longitudinal direction completely.

20. A linear drive as set forth in claim 7, wherein each principal housing body is an extrusion comprised of aluminum.

* * * * *